(12) United States Patent
   Fontenot (10) Patent No.: US 9,863,562 B2
(45) Date of Patent: Jan. 9, 2018

(54) METHOD AND APPARATUS FOR CLAMPING FLANGES AND OTHER CONNECTIONS

(71) Applicant: FLANGE CUFF, L.L.C., Breaux Bridge, LA (US)

(72) Inventor: Christopher W. Fontenot, Youngsville, LA (US)

( * ) Notice: Subject to any disclaimer, the term of this patent is extended or adjusted under 35 U.S.C. 154(b) by 0 days.

(21) Appl. No.: 15/155,144

(22) Filed: May 16, 2016

(65) Prior Publication Data

US 2017/0184231 A1    Jun. 29, 2017

Related U.S. Application Data

(62) Division of application No. 14/979,771, filed on Dec. 28, 2015.

(51) Int. Cl.
   *F16L 23/00*   (2006.01)
   *F16L 23/02*   (2006.01)
   *F16L 55/18*   (2006.01)

(52) U.S. Cl.
   CPC ............. *F16L 23/003* (2013.01); *F16L 23/02* (2013.01); *F16L 55/18* (2013.01)

(58) Field of Classification Search
   CPC .......... F16L 23/003; F16L 55/18; F16L 23/02
   See application file for complete search history.

(56) References Cited

U.S. PATENT DOCUMENTS

| 4,488,744 A    * | 12/1984 | Bubeck ................. | F16L 23/04 |
|  |  |  | 285/365 |
| 2009/0194994 A1 * | 8/2009 | Weinhold ............... | F16L 23/06 |
|  |  |  | 285/365 |
| 2010/0244443 A1 * | 9/2010 | Irgens ................... | B25B 27/16 |
|  |  |  | 285/406 |
| 2010/0320758 A1 * | 12/2010 | Sisk ....................... | F16L 25/12 |
|  |  |  | 285/420 |

* cited by examiner

*Primary Examiner* — John C Hong
(74) *Attorney, Agent, or Firm* — Ted M. Anthony (57) ABSTRACT

A clamp assembly for temporarily applying compressive force to a flange connection assembly, such as a bolted pipe flange. Frame members are pivotally attached to interconnecting linkage members to form an elongate assembly having joinable ends. When installed around the circumference of a flange connection assembly, interchangeable cuff members removably attached to the frame members apply compressive forces to a flange connection assembly in order to facilitate a fluid-pressure seal.

11 Claims, 11 Drawing Sheets

PRIOR ART

FIG. 1

PRIOR ART

METHOD AND APPARATUS FOR CLAMPING FLANGES AND OTHER CONNECTIONS

CROSS REFERENCES TO RELATED APPLICATIONS

This application is a divisional of U.S. patent application Ser. No. 14/979,771, filed Dec. 28, 2015, currently pending.

STATEMENTS AS TO THE RIGHTS TO THE INVENTION MADE UNDER FEDERALLY SPONSORED RESEARCH AND DEVELOPMENT

None

BACKGROUND OF THE INVENTION

1. Field of the Invention

The present invention pertains to a method and apparatus for repairing flange connections including, without limitation, bolted pipe flange connections. More particularly, the present invention pertains to a clamp assembly for securing bolted pipe flange connection members together such as, for example, during repair or maintenance of said flange connection members or replacement of bolts or other flange components.

2. Brief Description of the Prior Art

Pipes and other tubular sections are frequently joined using mating flange connection assemblies. Such flange connection assemblies typically comprise substantially planar opposing plate-like members having aligned transverse bores. The mating plate-like flange members are joined, and then secured together using fasteners such as threaded bolts and mating nuts. Such bolts or other fasteners are used to provide compressive force to urge such pipe flange members toward each other and to secure said pipe flange members in place. In many cases, a plurality of such bolts or other fasteners is disposed in a substantially circular pattern through such mating flange members.

Frequently, one or more of said threaded bolts and/or nuts can become damaged due to weathering, oxidation and/or other factors. In such cases, it is frequently beneficial to remove and replace such damaged bolts/nuts. In other instances, said bolts and/or nuts are removed and replaced as part of a predetermined schedule or structured preventative maintenance program.

In some cases, said bolts and/or nuts can be unthreaded, separated and removed using wrenches or other tools. In other cases, the conditions of said bolts and/or nuts are so severely degraded or damaged that said bolts and/or nuts must be cut apart using welding torches, saws or other devices in order to facilitate removal from such mated flange members. Once removed, the existing/damaged bolts can then be replaced with new bolts, nuts or other fasteners.

Pipes or other tubular sections joined using flange connection assemblies often contain fluid(s), and said fluid(s) are frequently pressurized. As a result, flange connection assemblies must generally provide a fluid-tight pressure seal to contain such fluids and prevent leakage of the fluids from the interface between said mating flange members. A fluid pressure seal formed by a joined flange connection assembly can frequently be broken when one or more bolt fasteners are removed from said flange connection assembly. When such a seal breaks, fluid(s) contained within said flange connection assembly and related pipes/tubular goods can leak from said flange connection assembly, resulting in contamination of a surrounding environment and/or exposure of personnel to harmful, flammable or hazardous fluids.

In order to prevent such unwanted leakage or discharge of fluids, such pipe or tubular sections are frequently drained or evacuated of fluids before bolts or other fasteners are removed from a flange connection assembly. Unfortunately, fluid flow interruption and pipe draining process can be time consuming and expensive. For example, for flange assemblies located on oil and gas production facilities, shutting in of production, and purging of pipes and/or flow lines, can be an extremely expensive and disruptive process.

In certain circumstances, bolts can be cut or otherwise removed from a flange connection assembly without interrupting the flow of fluids through said flange connection assembly, and/or draining fluids from associated pipes/tubular goods, using a process commonly referred to as "hot bolting". In such cases, an ancillary clamp or other external means can be used to compress and/or secure opposing flange members together in order to maintain a fluid-tight pressure seal across a flange connection assembly even when one or more bolts are loosened or removed. However, conventional means of securing opposing flange members together for this purpose generally suffer from a number of important limitations including, without limitation, devices that are bulky, expensive, and difficult to install and/or operate. Thus, there is a need for an inexpensive, effective and versatile means for temporarily securing opposing members of a flange connection assembly together, particularly during bolt removal and replacement operations.

SUMMARY OF THE INVENTION

In a preferred embodiment, the present invention comprises a clamp assembly that can be installed on flange connection assemblies. Said clamp assembly can compress opposing plate-like flange members together, and/or secure said members in place, in order to maintain a fluid pressure seal across a flange connection assembly even when one or more bolts are removed (such as, for example, during a "hot bolting" process). The clamp assembly of the present invention is compact, inexpensive, effective and easy to operate. Further, the clamp assembly of the present invention can be conveniently transported between job locations, and stored during periods of non-use.

The clamp assembly of the present invention comprises a plurality of frame or body members (including at least one latch member), as well as a plurality of intermediate linkage members. An intermediate linkage member is pivotally disposed between each frame member. When opened, said clamp assembly can be spread apart, similar to links of a chain. However, when closed and latched, said clamp assembly can form a generally ring-shaped clamp structure that can securely fit around the external surface of a flange connection assembly.

During operation, the clamp assembly of the present invention can be opened, at least partially spread apart, and then closed together around the outer surface or circumference of a flange connection assembly. Said clamp assembly is then typically secured in place by attaching a first end of the clamp assembly to an opposite second end of said clamp assembly (typically using a latch member). In a preferred embodiment, the present invention further comprises a latch assembly allowing said first end to be connected to said second end, while further permitting said clamp assembly to be tightened against said flange connection assembly.

Further, the clamp assembly of the present invention can include a plurality of removable or interchangeable cuff members. Said cuff members can be removably attached (typically using threaded bolts, fasteners or other attachment means) to said frame members, and can be sized to accommodate particular flange connection members. By way of illustration, but not limitation, said cuff members can be sized to accommodate a three inch flange connection assembly, and thereafter removed/replaced to accommodate a two inch flange connection assembly.

The clamping assembly of the present invention permits bolts to be cut or otherwise removed from a flange connection assembly without interrupting the flow of fluids through said flange connection assembly and/or draining fluids from pipes/tubular goods. In operation, the clamp assembly of the present invention can be hingedly spread apart or opened, and placed adjacent to a flange connection assembly. Said clamp assembly can then be hingedly closed or joined together around the outer surface of said flange members, and secured together to compress flange connection members together.

In this manner, the clamping assembly of the present invention can be used to compress and/or secure opposing flange members together in order to maintain a fluid-tight pressure seal across a flange assembly even when one or more bolts of said flange assembly are loosened or removed. Unlike conventional means of securing opposing flange members together for this purpose, the clamping assembly of the present invention comprises an inexpensive, effective and user-friendly apparatus for temporarily securing opposing flange members together, particularly during the bolt removal and replacement process. Further, the clamp assembly of the present invention can be effectively used to clamp flange connection assemblies that are located in tight spaces and/or adjacent to other objects that obstruct access to said flange connection assemblies.

BRIEF DESCRIPTION OF DRAWINGS/FIGURES

The foregoing summary, as well as any detailed description of the preferred embodiments, is better understood when read in conjunction with the drawings and figures contained herein. For the purpose of illustrating the invention, the drawings and figures show certain preferred embodiments. It is understood, however, that the invention is not limited to the specific methods and devices disclosed in such drawings or figures.

DETAILED DESCRIPTION OF A PREFERRED EMBODIMENT

Figure 1:
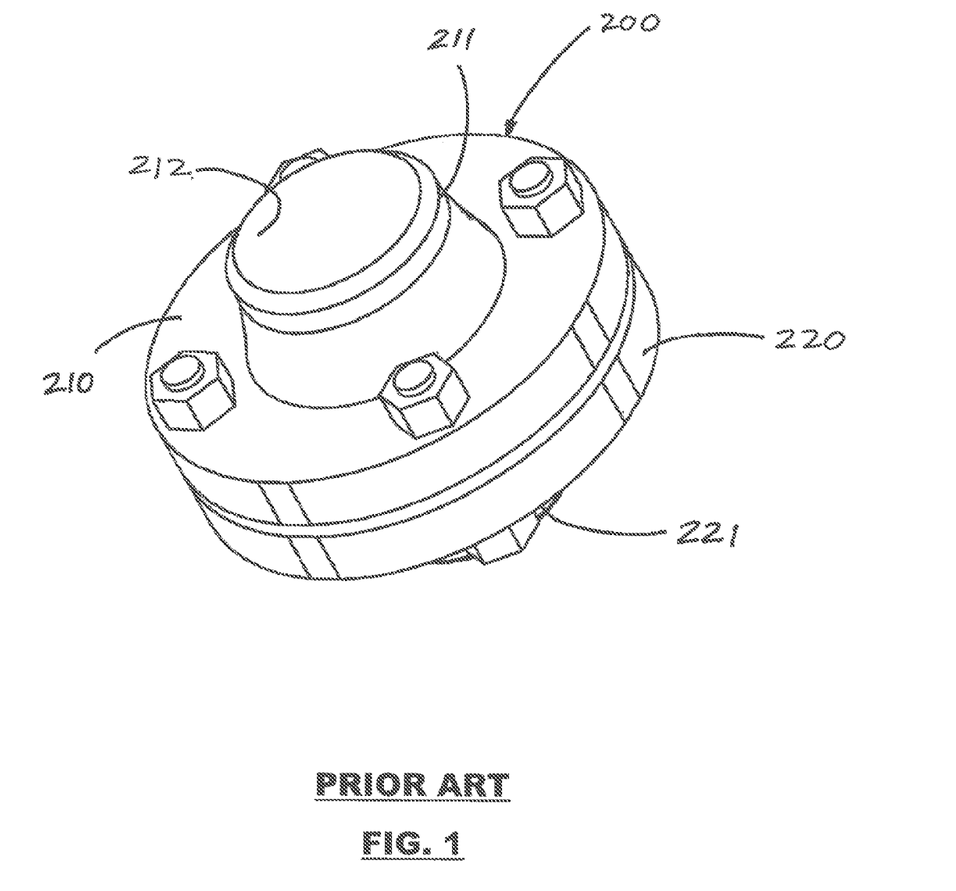
FIG. 1 depicts a side perspective view of a bolted flange connection.

Referring to the drawings, FIG. 1 depicts an overhead perspective view of a conventional flange connection assembly 200 which can be used for joining or otherwise connecting pipes and/or other tubular sections. Flange connection assembly 200 comprises opposing plate-like substantially planar flange members 210 and 220 that are joined in a face to face orientation and abutting relationship. Flange member 210 has a pipe stub 211 having an inner surface 212 and defining a central flow bore (oriented substantially perpendicular to planar flange member 210), while flange member 220 has a pipe stub 221 (partially visible in FIG. 1).

Figure 2:
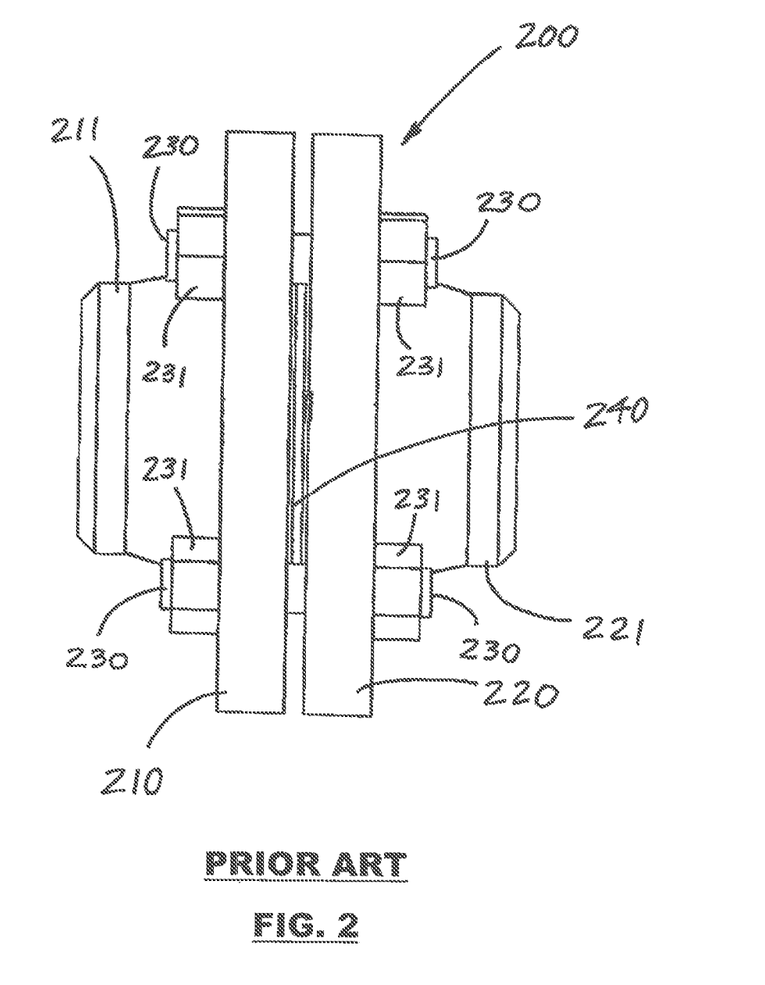
FIG. 2 depicts a side view of a bolted flange connection.

FIG. 2 depicts a side view of conventional connection flange assembly 200 depicted in FIG. 1. Opposing plate-like and substantially planar flange members 210 and 220 are joined in an abutting, face to face orientation. Flange member 210 has pipe stub 211 defining a central flow bore (not visible in FIG. 2 but oriented substantially perpendicularly to planar flange member 210), while flange member 220 has a pipe stub 221 defining a central flow bore (not visible in FIG. 2 but oriented substantially perpendicularly to planar flange member 220); said aligned central flow bores permit fluid to flow through said joined connection flange assembly 200. Further, said pipe stubs 211 and 221 can each be welded or otherwise attached to a section of pipe or other tubular member in a manner well known to those having skill in the art.

Conventional plate-like flange members 210 and 220 each have aligned transverse bores or bolt holes for receiving a plurality of threaded bolts 230. Nuts 231 are threadedly received on said bolts 230; tightening of said nuts 231 on bolts 230 applies compressive forces to flange members 210 and 220, which acts to draw said flange members together. Frequently, a gasket or seal ring 240 is installed between flange members 210 and 220 to ensure a fluid pressure seal is formed between said joined flange members 210 and 220. Referring back to FIG. 1, although other patterns can be used, bolts 230 are typically disposed in a substantially circular pattern around flange members 210 and 220.

As discussed above, one or more of said threaded bolts 230 and/or nuts 231 can become damaged due to weathering, oxidation, corrosion and/or other factors. In such cases, it is frequently beneficial to remove and replace such damaged bolts/nuts. In other instances, said bolts and/or nuts are removed and replaced as part of a predetermined schedule or structured preventative maintenance program. However, without other sealing means, loosening of one or more nuts 231, or removal of one or more bolts 230, can result in breaking of a fluid pressure seal formed by flange assembly 200.

Figure 3:
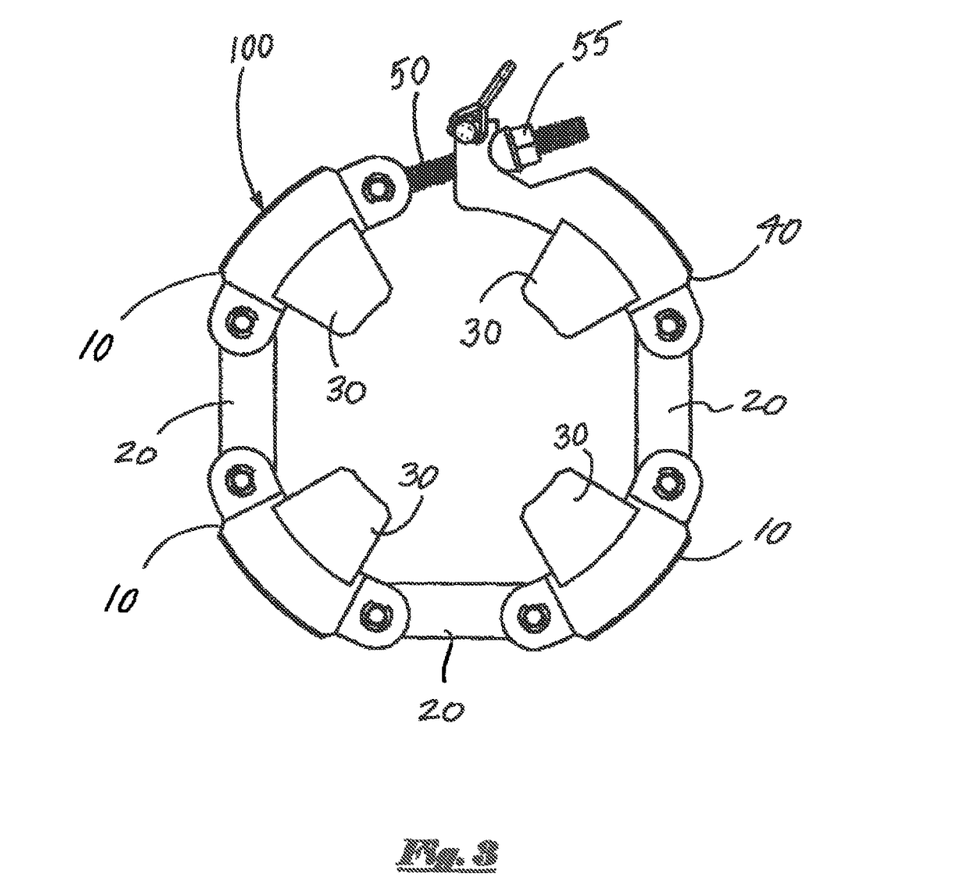
FIG. 3 depicts an overhead view of a flange clamp assembly of the present invention.

FIG. 3 depicts an overhead view of a flange clamp assembly 100 of the present invention in a closed position. Flange clamp assembly 100 can be installed on flange connection assemblies, such as conventional flange connection assembly 200 depicted in FIGS. 1 and 2. As discussed more fully herein, said clamp assembly 100 can compress opposing plate-like flange members (such as, for example, flange members 210 and 220 depicted in FIGS. 1 and 2) together, and/or secure said members in place, in order to maintain a fluid pressure seal across a flange connection assembly even when one or more bolts are removed such as, for example, during a "hot bolting" process. It is to be observed that clamp assembly 100 of the present invention is lightweight, compact, inexpensive, effective and easy to maneuver and operate. Further, clamp assembly 100 can be conveniently transported between job locations, and stored during periods of non-use.

Still referring to FIG. 3, clamp assembly 100 of the present invention comprises a plurality of frame or body members 10, including at least one latch or locking frame member 40. At least one intermediate linkage member 20 is pivotally disposed between each frame member 10, as well between locking frame member 40 and the adjacent frame member 10. Threaded eyebolt 50 is pivotally attached to a frame member 10 and received by locking frame member 40. Nut 55 on bolt 50 secures the ends of clamp assembly 100 together, while tightening of said nut 55 on said bolt 55 draws said ends together. Further, cuff members 30 are attached to each frame member 10, and to locking frame member 40.

When bolt 50 is latched to locking frame member 40, the ends of clamp assembly 100 are joined together. In such configuration, clamp assembly 100 forms a ring or loop. By tightening nut 55 on bolt 50, the joined ends of said loop are drawn together, which causes the circumference of said loop to restrict and impart forces radially inward generally toward the midpoint or center of said loop formed by said clamp assembly.

Figure 4:
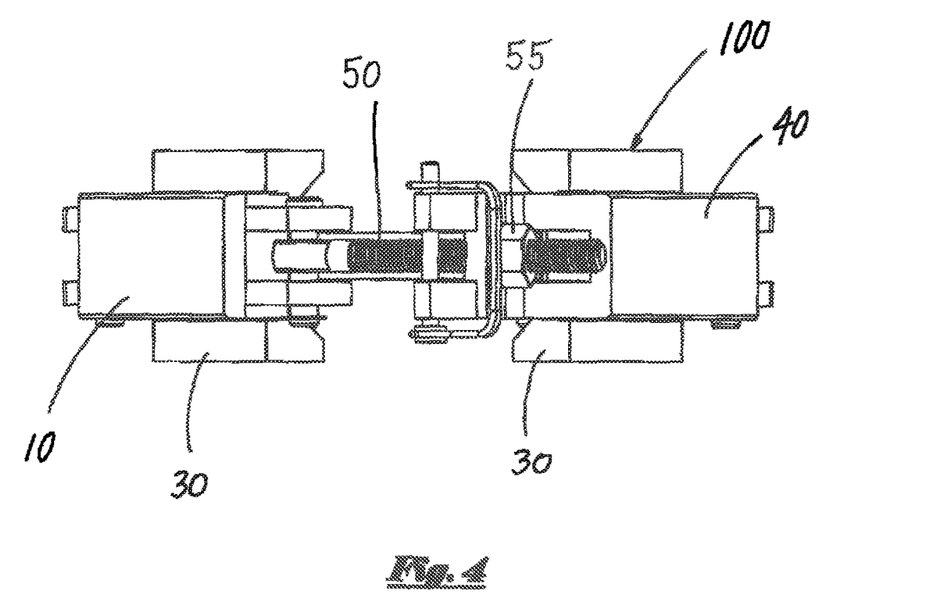
FIG. 4 depicts side view of a flange clamp assembly of the present invention.
Figure 5:
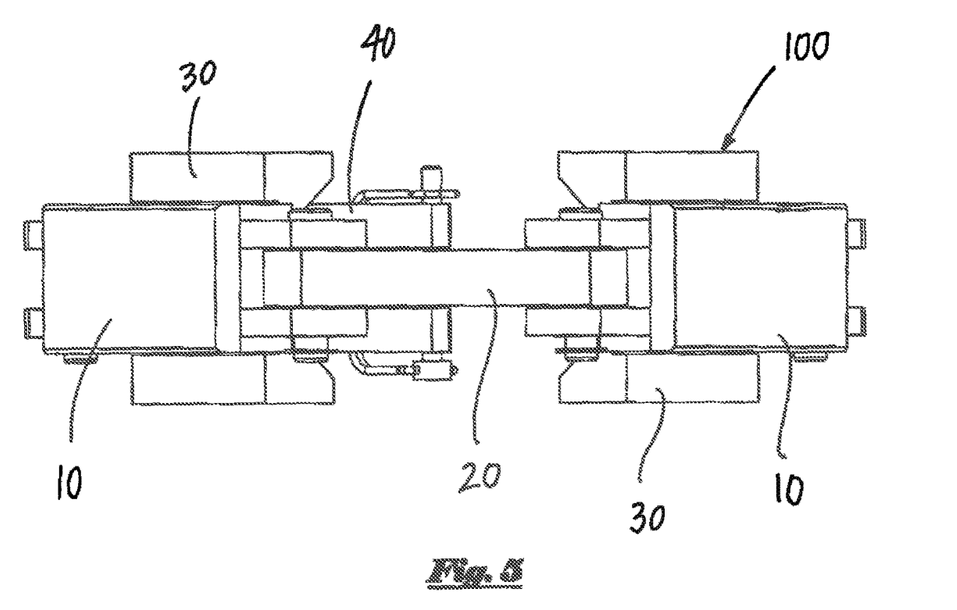
FIG. 5 depicts side view of a flange clamp assembly of the present invention, rotated from the view depicted in FIG. 4.

FIG. 4 depicts a side view of flange clamp assembly 100 of the present invention 100. FIG. 5 depicts side view of a flange clamp assembly 100 of the present invention, rotated approximately 180 degrees from the view depicted in FIG. 4. As noted above, clamp assembly 100 of the present invention comprises a plurality of frame or body members 10 and a latch or locking frame member 40. As more clearly visible in FIG. 5, at least one intermediate linkage member 20 is pivotally disposed between adjacent frame members 10.

As depicted in FIG. 4, threaded eyebolt 50 is pivotally attached to a frame member 10 and, when closed, partially received within a recess formed in locking frame member 40. Nut 55 on bolt 50 secures the ends of clamp assembly 100 together, while tightening of said nut 55 on said bolt 55 draws the latched ends of clamp assembly 100 together. Further, cuff members 30 are attached to each frame member 10, and to locking frame member 40.

Figure 6:
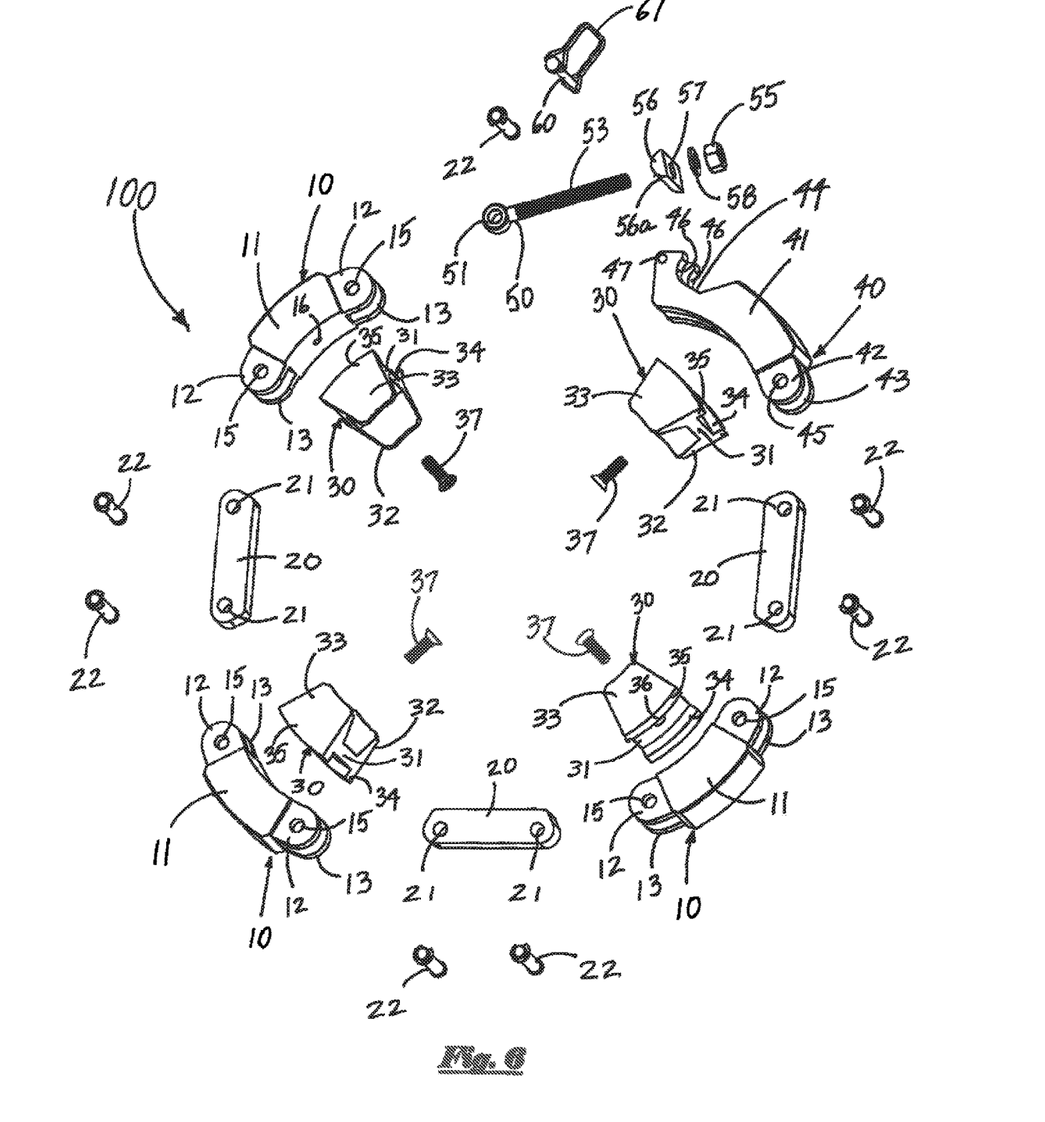
FIG. 6 depicts an exploded perspective view of a flange clamp assembly of the present invention.

FIG. 6 depicts an exploded perspective view of flange clamp assembly 100 of the present invention. Flange clamp assembly 100 comprises a plurality of frame members 10. Each frame member 10 generally comprises a central body section 11 as well as clevis brackets disposed at both ends of said central body section 11; said clevis brackets are formed by substantially parallel first clevis bracket plate 12 and second clevis bracket plate 13. Aligned bores 15 extend through said first and second clevis bracket plates 12 and 13, respectively.

A linkage segment or member 20 is pivotally disposed between each frame member 10. In a preferred embodiment, each linkage member 20 has end bores 21. Each linkage member 20 has a first end disposed within a clevis bracket of a first frame member 10 (that is, an end portion of a linkage member 20 is received between first clevis bracket plate 12 and second clevis bracket plate 13) while the opposite end of linkage member 20 is disposed within a clevis bracket of a second frame member 10 (that is, between an end portion of a linkage member 20 is received between first clevis bracket plate 12 and second clevis bracket plate 13). Linkage pivot pins 22 are disposed within aligned bores 21 of linkage members 20 and 15 of frame members 10, thereby permitting adjacent linkage members 20 and frame members 10 to rotate or swivel relative to each other about pivot axes extending through the longitudinal axis of pivot pins 22.

Further, clamp assembly 100 comprises a plurality of removable or interchangeable cuff members 30, each having a web member 31, lower cuff extension 32, upper cuff extension 33, lower rear extension 34 and upper rear extension 35. In a preferred embodiment, said cuff members 30 are removably attached to frame members 10 (or locking frame member 40) using threaded bolts 37 received through a bore 36 extending through the web member 31 of each said cuff member 30, as well as bore 16 in each frame member 10 or locking frame member 40.

In a preferred embodiment, lower and upper rear extensions 34 and 35 of each cuff member 30 form opposing, spaced apart shoulders that are spaced apart a desired distance to receive a body section 11 of a frame member 10 to provide added support when said members are joined. Further, lower and upper cuff extensions 32 and 33 can be spaced apart a desired distance to receive particular flange connection assemblies. For example, lower and upper cuff extensions 32 and 33 of said cuff members 30 can be sized to accommodate flange connection assembly (such as, for example, flange connection assembly 200 depicted in FIGS. 1 and 2) having a certain thickness; said cuff members 30 can then be removed and replaced with other cuff members 30 having different spacing between said lower and upper cuff extensions 32 and 33 in order to accommodate a flange connection assembly having different dimensions. In this manner, said cuff members 30 are interchangeable to accommodate different operational parameters, such as may be encountered in the field.

Eye bolt 50 having eyelet 51 and external threads 53 is pivotally attached to a clevis bracket of a frame member 10 using pivot pin 22; said eye bolt 50 can rotate about a pivot axis passing through the longitudinal axis of said pivot pin 22. Semi-cylindrical locking member 56 having curved surface 56a and bore 57, as well as washer 58 and threaded nut 55, are received on bolt 50.

Locking frame member 40 comprises a central body section 41 as well as a clevis bracket formed by substantially parallel first clevis bracket plate 42 and second clevis bracket plate 43. Aligned clevis bore 45 extends through said first and second clevis bracket plates 42 and 43, respectively, allowing for pivotal attachment to a linkage member 20 using a pivot pin 22. Locking frame member 40 further comprises a recessed area 44 defining substantially parallel shoulder members 46 defining substantially convex surfaces. Said convex surfaces are generally adapted to receive curved surface 56a of locking member 56. Bore 47 extends through locking frame member 40. Safety latch pin 60 (having attached latch safety bar 61) is pivotally disposed through said bore 47.

When opened, clamp assembly 100 can be spread apart, similar to unfurling or opening pivotally attached links of a roller chain. However, when closed and latched, said clamp assembly 100 can form a generally ring-shaped or looped clamp structure that can securely fit around the external surface of a flange connection assembly such as, for example, conventional flange connection assembly 200 depicted in FIGS. 1 and 2.

Figure 7:
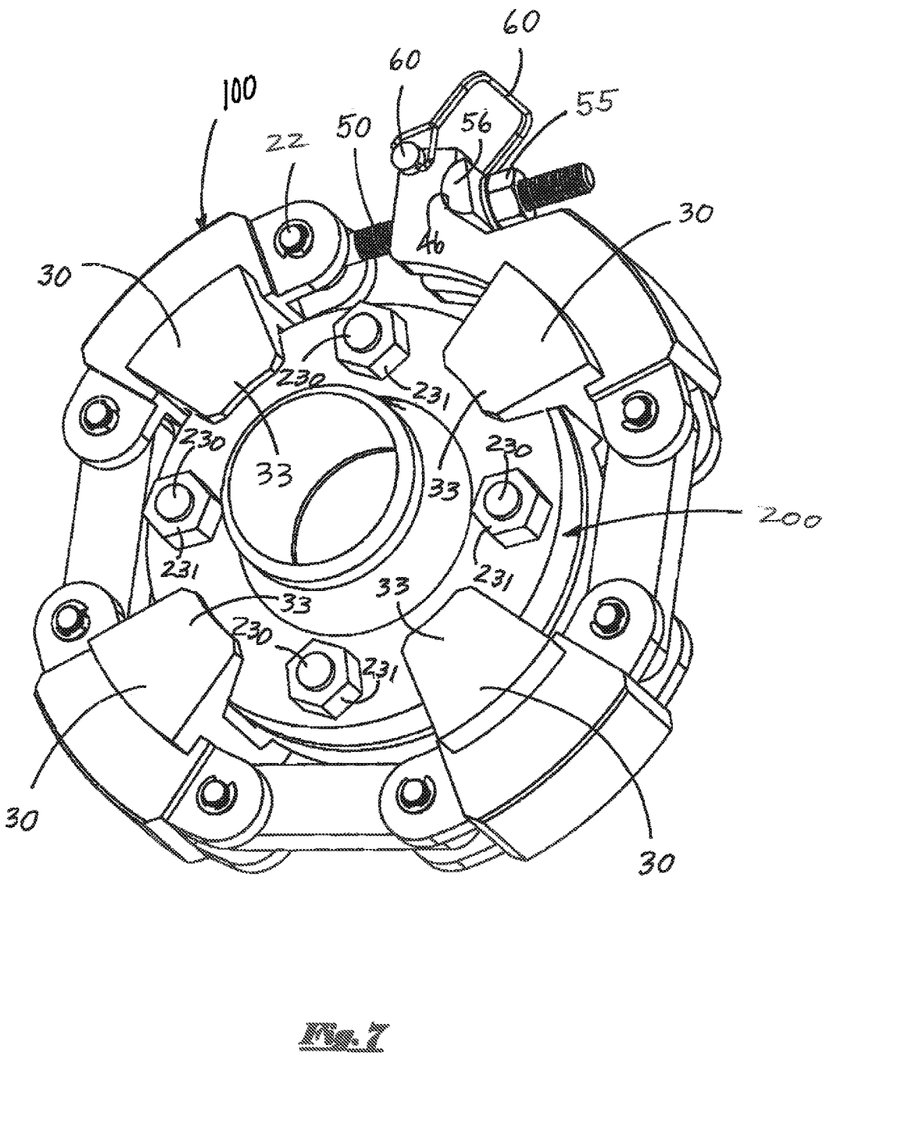
FIG. 7 depicts an overhead perspective view of a flange clamp assembly of the present invention installed on a bolted flange connection.
Figure 8:
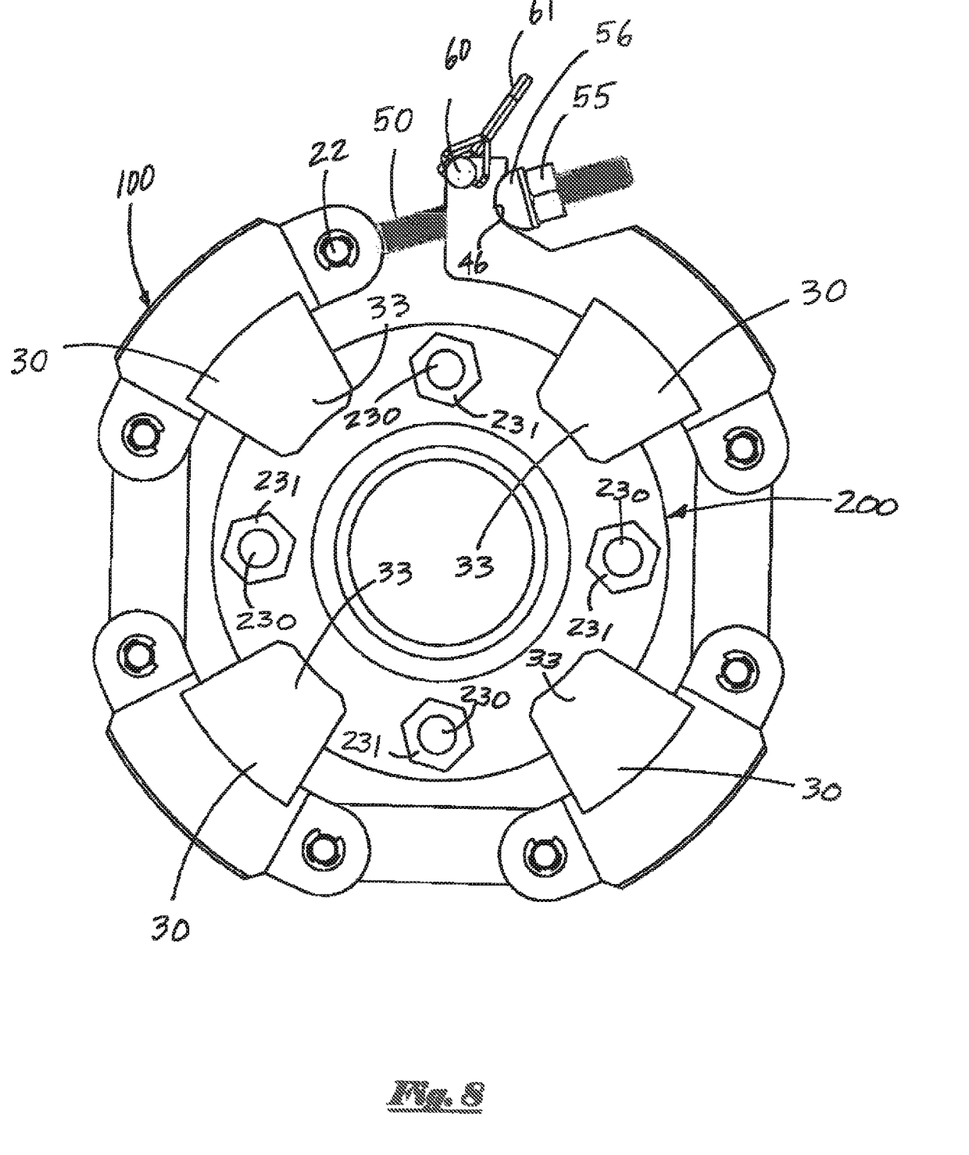
FIG. 8 depicts an overhead view of a flange clamp assembly of the present invention installed on a bolted flange connection.

FIG. 7 depicts an overhead perspective view of a flange clamp assembly 100 of the present invention installed on a conventional bolted flange connection assembly 200, while FIG. 8 depicts an overhead view of a flange clamp assembly of the present invention installed on a bolted flange connection. When installed on a bolted flange connection 200 as depicted in FIGS. 7 and 8, cuff members 30 of clamp assembly 100 are positioned generally between threaded fastening bolts 230 and nuts 231. Upper cuff extensions 33, and lower cuff extensions 32 (not visible in FIGS. 7 and 8) can be spaced apart a desired distance to receive conventional bolted flange connection assembly 200.

Figure 9:
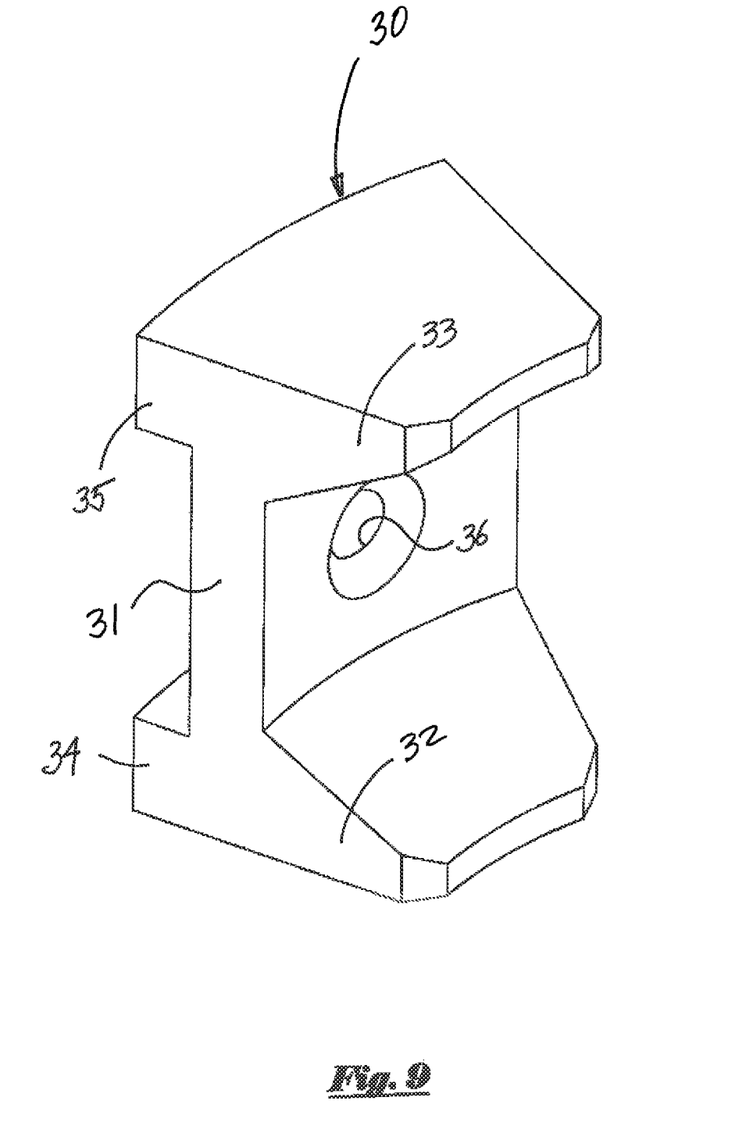
FIG. 9 depicts a front perspective view of a cuff member 30.
Figure 10:
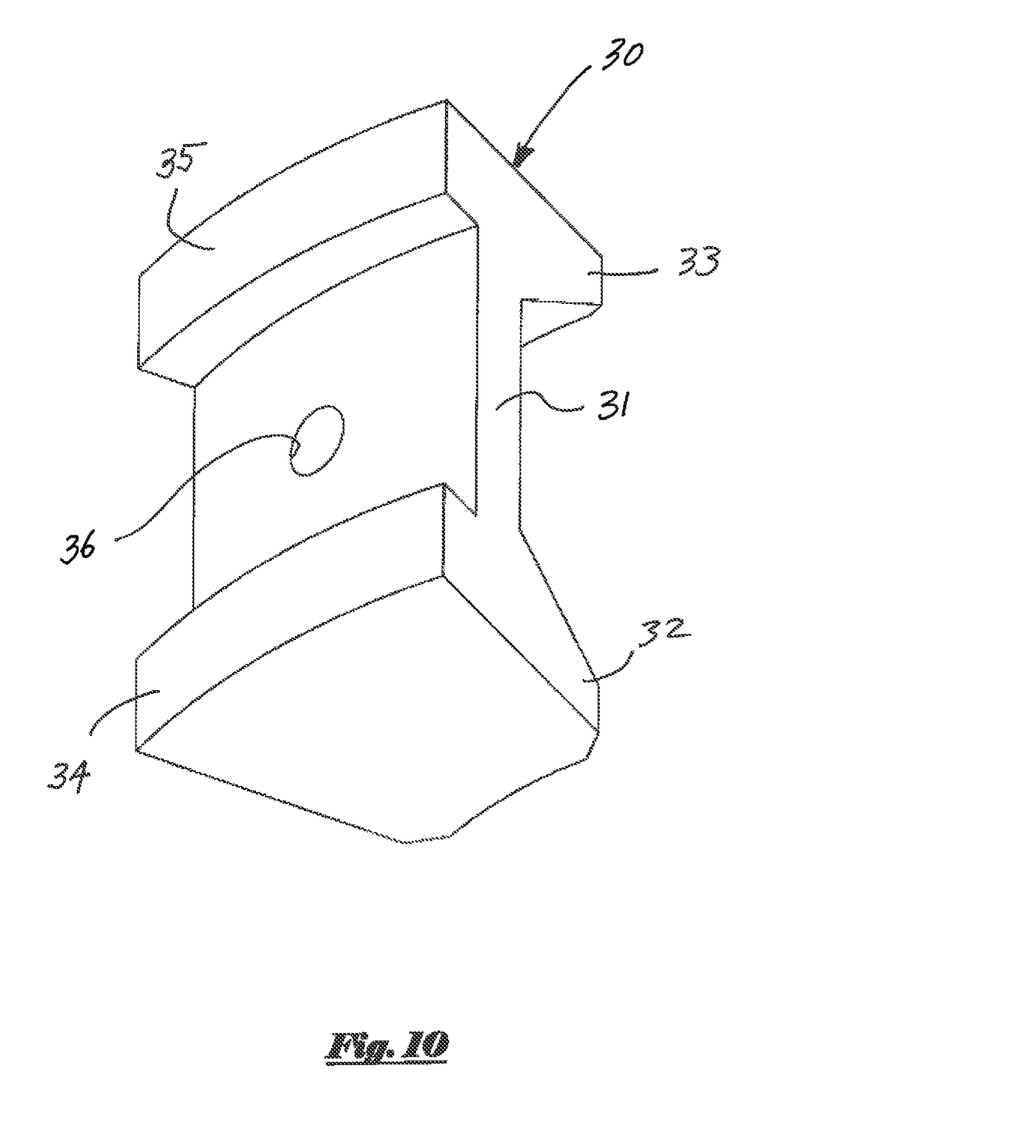
FIG. 10 depicts a rear perspective view of said cuff member 30.

FIG. 9 depicts a front perspective view of a cuff member 30, while FIG. 10 depicts a rear perspective view of said cuff member 30. Referring to FIGS. 9 and 10, said cuff member 30 has a web member 31, a lower cuff extension 32, an upper cuff extension 33, a lower rear extension 34 and an upper rear extension 35. As discussed in detail above, said cuff member 30 is adapted to be attached to a frame members (such as frame members 10 or frame member 40 depicted in FIG. 6) using a threaded bolt received through bore 36 extending through the web member 31 of said cuff member 30.

Figure 11:
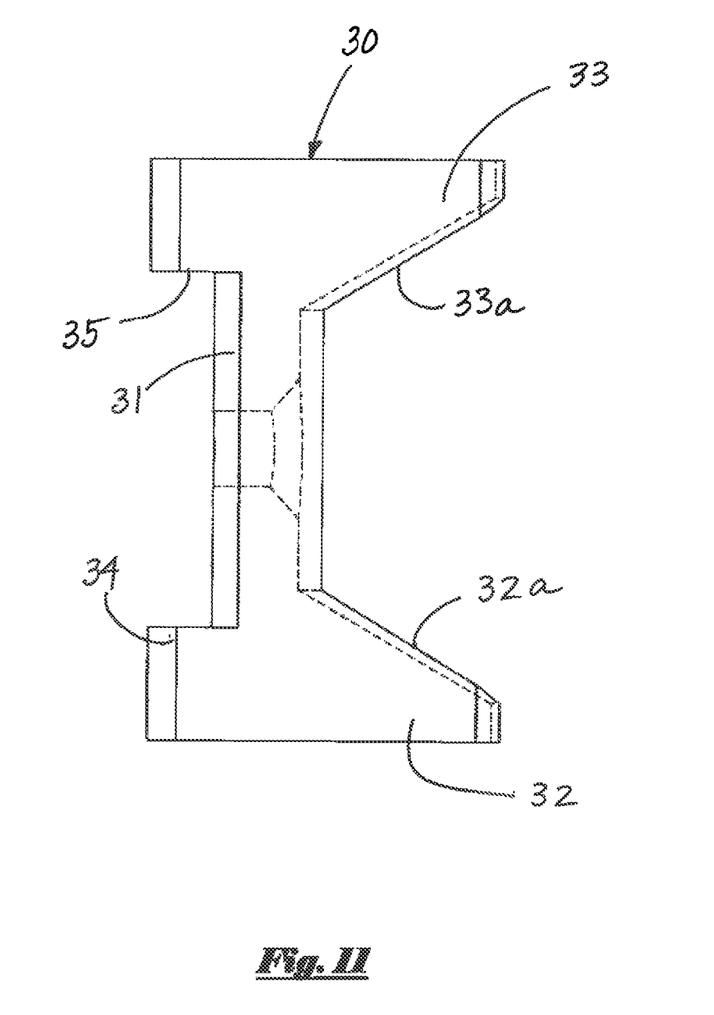
FIG. 11 depicts a side view of a cuff member 30.

FIG. 11 depicts a side view of a cuff member 30 of the present invention. Cuff member 30 has a web member 31, a lower cuff extension 32, an upper cuff extension 33, a lower rear extension 34 and an upper rear extension 35. As discussed in detail above, said cuff member 30 is adapted to be attached to a frame member (such as frame members 10 or frame member 40 depicted in FIG. 6) using a threaded bolt received through bore 36 extending through web member 31 of said cuff member 30.

Lower rear extension 34 and upper rear extension 35 of cuff member 30 cooperate to form opposing shoulders that are spaced apart a desired distance to receive a body section of a frame member 10 or locking frame member 40 to provide added support when said members are joined. Further, lower cuff extension 32 and upper cuff extension 33 can be spaced apart a desired distance to receive particular flange connection assemblies.

For example, lower cuff extension 32 and upper cuff extension 33 of said cuff member 30 can be sized to accommodate flange connection assembly (such as, for example, flange connection assembly 200 depicted in FIGS. 1 and 2) having a certain thickness; said cuff member 30 can then be removed and replaced with another cuff member 30 having different spacing between said lower and upper cuff extensions in order to accommodate a flange connection assembly having different dimensions. In this manner, different cuff members can be interchangeable to accommodate different operational parameters, such as may be encountered in the field.

Further, when cuff member 30 is forced radially inward toward a flange member, tapered surface 33a of upper cuff extension 33 cooperates with tapered surface of 32a of lower cuff extension 32 to apply compressive force to a flange connection assembly received between said extensions 32 and 33. In this manner, cuff 30 can apply compressive force to mating members of a flange connection assembly and to secure said opposing members of said flange connection assembly in place (such as, for example, to facilitate a fluid pressure seal).

During operation, latch safety bar 61 can be moved away from bolt 50 and nut 55 on eye bolt 50 can be sufficiently loosened until eye bolt 50 can be swiveled about pivot pin 22 and removed from locking frame member 40. In this configuration, clamp assembly 100 can be at least partially opened or spread apart via pivotal connections of frame members 10 and linkage members 20. Said clamp assembly 100 can be placed in proximity to flange connection assembly 200 (and, typically, the outer circumferential surfaces thereof), and then closed together around the outer surface of said flange connection assembly 200. When so positioned, cuff members 30 of clamp assembly 100 are generally disposed between threaded fastening bolts 230 and nuts 231; specifically, said flange connection assembly fits within the space formed between extensions 32 and 33 of each cuff member 30. In such configuration, extensions 33 are disposed against one surface of said flange connection assembly, while extensions 32 are disposed against the opposite side of said flange connection assembly.

Once positioned around the outer surface of flange connection assembly 200, eye bolt 50 can be positioned between substantially parallel shoulder surfaces 46. Bolt 55 can be tightened, forcing locking member 56 toward said shoulder surfaces 46 and, in turn, restricting the circumference of ring-like clamp assembly 100. As the diameter of ring-like clamp assembly 100 closes around flange connection assembly 200, cuff members 30 are forced inward, generally in the direction of the center of flange connection assembly 200. Tapered surfaces 33a of upper cuff extensions 33 cooperate with tapered surfaces of 32a of lower cuff extensions 32 to apply compressive force to said flange connection assembly 200. In this manner, clamp assembly 100 acts as a clamp or cuff to apply said compressive force to said flange connection assembly and to secure opposing members of said flange connection assembly 200 in place (such as, for example, to facilitate a fluid pressure seal).

With clamp assembly 100 of the present invention installed, safety latch bar 61 can be pivoted toward bolt 50 to prevent said bolt from inadvertently detaching from locking frame member 40. Fastening bolts 230 and nuts 231 can be cut or otherwise removed from flange connection assembly 200 without breaking a fluid pressure seal formed by said flange connection assembly. As such, with clamp assembly 100 installed on said flange connection assembly 200, it is not necessary to interrupt the flow of fluids through said flange connection assembly 200 and/or to drain fluids from said flange connection assembly 200 or any associated pipes/tubular goods. In this manner, clamp assembly 100 of the present invention can be used to compress and/or secure opposing flange members together in order to maintain a fluid-tight pressure seal across a flange connection assembly even when one or more bolts of said flange assembly are loosened or removed.

Further, clamp assembly 100 of the present invention can be quickly and efficiently installed as a temporary remedy to fix a leaking flange connection assembly pending repair or replacement thereof. Said clamp assembly 100 can be colored with or incorporate fluorescent or other bright colors, thereby making said clamp assembly more visibly noticeable to observers, particularly when said clamp assembly is installed on a flange or other equipment having substantially the same or similar coloring as the surrounding equipment or environment. In this manner, said coloring can serve as a means of attracting attention and, further, alerting onlookers to the installation of the clamp assembly on such flange or other equipment.

The clamp assembly of the present invention comprises an inexpensive, effective and user-friendly apparatus for temporarily securing opposing flange members together, particularly during the bolt removal and replacement process. Further, the clamp assembly of the present invention can be effectively used to clamp flange connection assemblies that are located in tight spaces and/or positioned adjacent to other objects that obstruct free access to said flange connection assemblies.

The above-described invention has a number of particular features that should preferably be employed in combination, although each is useful separately without departure from the scope of the invention. While the preferred embodiment of the present invention is shown and described herein, it will be understood that the invention may be embodied otherwise than herein specifically illustrated or described, and that certain changes in form and arrangement of parts and the specific manner of practicing the invention may be made within the underlying idea or principles of the invention.

What is claimed:

1. A method for removing and replacing at least one bolt of a bolted flange assembly having an upper surface and a lower surface comprising:
   a) installing a flange clamp assembly on said flange assembly, wherein said flange clamp assembly comprises:
      i) a plurality of frame members;
      ii) a plurality of linkage members pivotally disposed between said frame members, said frame members and linkage members defining a first end and a second end;
      iii) a latch assembly adapted to connect said first end to said second end and selectively draw said first end toward said second end;
      iv) a cuff member removably attached to at least one of said frame members, wherein said cuff member comprises:
         aa) a first substantially planar extension defining a first tapered surface adapted to be received against said upper surface of said flange assembly;
         bb) a second substantially planar extension defining a second tapered surface adapted to be received against said lower surface of said flange assembly, wherein said first and second extensions are spaced to be received between bolts of said flange assembly;
   b) cutting at least one bolt of said flange assembly;
   c) removing said at least one bolt from said flange assembly;
   d) replacing said at least one bolt in said flange assembly; and
   e) removing said flange clamp assembly from said flange assembly.

2. The method of claim 1, wherein said step of cutting said at least one bolt is performed without interrupting flow of fluid through said flange assembly.

3. The method of claim 1, further comprising the steps of:
   a) selecting said cuff member from a plurality of interchangeable cuff members; and
   b) installing said selected cuff member on said at least one body member of said flange clamp assembly.

4. The method of claim 3, wherein said plurality of interchangeable cuff members comprises at least two cuff members having different dimensions.

5. The method of claim 3, further comprising the step of drawing said first end and said second end together to apply compressive force to said upper and lower surfaces of said flange assembly.

6. A method for removing and replacing a bolt of a bolted flange assembly having an upper surface and a lower surface comprising:
   a) determining dimensions of said flange assembly;
   b) selecting at least one cuff member sized to accommodate said dimensions of said flange assembly from a plurality of interchangeable cuff members, wherein each of said members comprise:
      i) a first substantially planar extension defining a first tapered surface adapted to be received against an upper surface of said flange assembly;
      ii) a second substantially planar extension defining a second tapered surface adapted to be received against said lower surface of said flange assembly;
   c) installing said at least one selected cuff member on a flange clamp assembly, wherein said flange clamp assembly comprises:
      i) a plurality of frame members, wherein each of said frame members are adapted to operationally attach to a selected cuff member;
      ii) a plurality of linkage members pivotally disposed between said frame members, said frame members and linkage members defining a first end and a second end;
      iii) a latch assembly adapted to connect said first end to said second end and selectively draw said first end toward said second end; and
   d) installing said flange clamp assembly on said flange assembly, wherein said first and second extensions of said at least one cuff member are spaced along the circumference of said flange assembly to be received between bolts of said flange assembly;
   e) cutting said bolt of said flange assembly;
   f) removing said bolt from said flange assembly;
   g) replacing said bolt in said flange assembly; and
   h) removing said flange clamp assembly from said flange assembly.

7. The method of claim 6, wherein said step of cutting said at least one bolt is performed without interrupting flow of fluid through said flange assembly.

8. The method of claim 6, further comprising the step of drawing said first end and said second end together to apply compressive force to said upper and lower surfaces of said flange assembly.

9. A method for removing and replacing a plurality of bolts of a bolted flange assembly having an upper surface and a lower surface comprising:
   a) determining dimensions of said flange assembly;
   b) selecting at least one cuff member sized to accommodate said dimensions of said flange assembly from a plurality of interchangeable cuff members, wherein each of said members comprise:
      i) a first substantially planar extension defining a first tapered surface adapted to be received against an upper surface of said flange assembly;
      ii) a second substantially planar extension defining a second tapered surface adapted to be received against said lower surface of said flange assembly;
   c) installing said at least one selected cuff member on a flange clamp assembly, wherein said flange clamp assembly comprises:
      i) a plurality of frame members, wherein each of said frame members are adapted to operationally attach to a selected cuff member;
      ii) a plurality of linkage members pivotally disposed between said frame members, said frame members and linkage members defining a first end and a second end;
      iii) a latch assembly adapted to connect said first end to said second end and selectively draw said first end toward said second end; and
   d) installing said flange clamp assembly on said flange assembly, wherein said first and second extensions of said at least one cuff member are spaced along the circumference of said flange assembly to be received between bolts of said flange assembly;
e) cutting a first bolt of said flange assembly;
f) removing said first bolt from said flange assembly;
g) replacing said first bolt in said flange assembly;
h) cutting a second bolt of said flange assembly;
i) removing said second bolt from said flange assembly;
j) replacing said second bolt in said flange assembly; and
k) removing said flange clamp assembly from said flange assembly.

10. The method of claim 9, wherein said steps of cutting said first and second bolts are performed without interrupting flow of fluid through said flange assembly.

11. The method of claim 9, further comprising the step of drawing said first end and said second end together to apply compressive force to said upper and lower surfaces of said flange assembly.

* * * * *